June 18, 1963 W. C. MALLISON Re. 25,395
PROCESS FOR BLENDING A HOT POLYESTER RESIN AND POLYMERIZABLE SOLVENT
Original Filed July 17, 1959
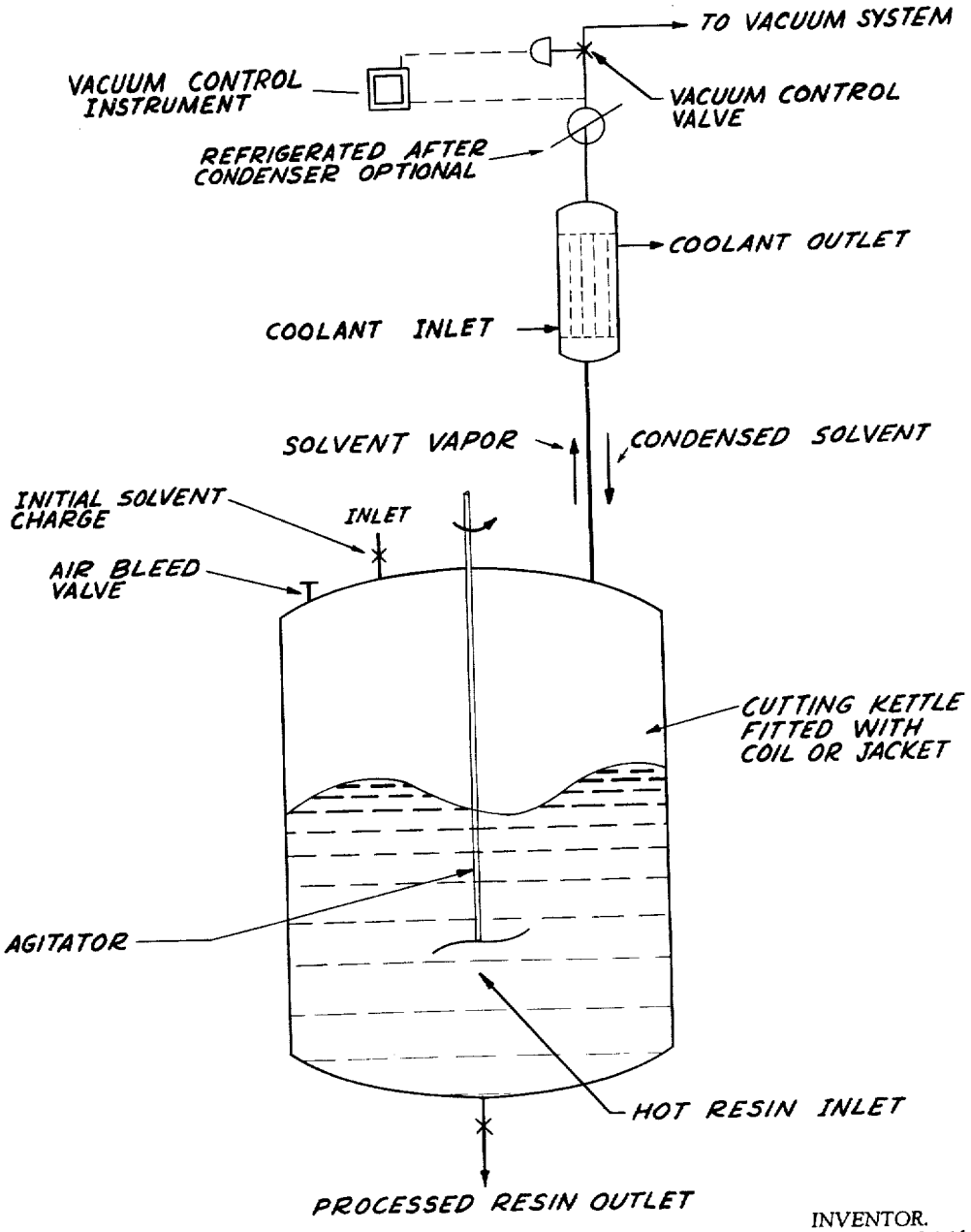
INVENTOR.
WILLIAM CHARLES MALLISON
BY James T. Dunn
ATTORNEY United States Patent Office Re. 25,395
Reissued June 18, 1963

25,395

PROCESS FOR BLENDING A HOT POLYESTER RESIN AND POLYMERIZABLE SOLVENT

William C. Mallison, Topsfield, Mass., assignor to American Cyanamid Company, New York, N.Y., a corporation of Maine Original No. 3,036,030, dated May 22, 1962, Ser. No. 827,939, July 17, 1959. Application for reissue Sept. 13, 1962, Ser. No. 224,280
12 Claims. (Cl. 260—45.4)

Matter enclosed in heavy brackets [ ] appears in the original patent but forms no part of this reissue specification; matter printed in italics indicates the additions made by reissue.

This invention relates to a novel and expedient procedure for the blending of a hot polyester resin with a polymerizably reactive diluent. Still further, this invention relates to a technique for blending a hot polyester resinous material with a normally-liquid polymerizably reactive diluent.

One of the objects of the present invention is to blend a hot polyester resinous material with a normally-liquid polymerizably reactive diluent in order to prepare such a resinous material for further processing. A further object of the present invention is to cut a hot polyester resin composition with a normally-liquid polymerizably reactive diluent by a technique which reduces processing time and results in a substantial economy in the procedure. These and other objects of the present invention will be discussed in greater detail hereinbelow.

The resinous materials used in the present invention are identified as polyester resinous materials which result from the esterification of a polyhydric alcohol with an alpha, beta-ethylenically unsaturated polycarboxylic acid. All of these polyester resins are well known in the art but the processing of these resins by present and past procedures have presented serious problems in handling the hot resin which procedures have added to the processing time and to the actual cost of production. These polyester resins are generally identified as an unsaturated polyester resin inasmuch as said resin is prepared by reacting a polyhydric alcohol and preferably a dihydric alcohol with an alpha, beta-ethylenically unsaturated polycarboxylic acid and preferably an alpha, beta-ethylenically unsaturated dicarboxylic acid. The unsaturated polyester resins used in the present invention are blended with a polymerizable monomer and upon proper catalysis are converted to a thermoset condition into such useful materials as laminates and the like.

In the prior art, polyester resins are conventionally prepared by heat-reacting a polyhydric alcohol with an alpha, beta-ethylenically unsaturated polycarboxylic acid. In order to achieve substantially complete esterification of the polycarboxylic acid with the polyhydric alcohol, heating is continued at elevated temperatures in the range of about 150° C. to about 250° C. until a relatively low acid number is achieved. There is no significant criticality in the acid number although generally it is desired to continue the reaction until the acid number has dropped below 100 and preferably below about 40. It is frequently conventional in certain instances to continue the esterification reaction until the acid number has dropped below 10. To accomplish this, it is generally desired to utilize the polyhydric alcohol in an amount calculated, on a stoichiometrical basis, to be sufficient, and preferably in excess by 10% to 30% of the amount required to completely esterify the polycarboxylic acid present. After the esterification has been completed to the selected acid number, the hot resinous material, having a temperature varying between about 150° C. and 250° C., and more particularly as a rule between about 180° C. and 210° C., requires cooling before it is cut with a polymerizably reactive solvent. If the cutting operation is accomplished at elevated temperatures without the benefit of the process of the present invention, substantial losses of the polymerizably reactive solvent will be experienced. On the other hand, the cooling operation consumes so much time that it adds to the cost of production. The art then has been confronted with the problem of blending the hot polyester resin with the reactive solvent and has seemingly had to choose between losing some of the solvent as a result of the volatilization or to undergo the costly procedure of cooling the hot resin down to a temperature which would permit its dilution with the solvent without suffering a loss due to said volatilization. A further complication enters the picture in cutting the hot resin with the solvent if no provision is made to cool the resin before cutting it with the polymerizably reactive solvent. Not only does one run the risk of losing solvent through volatilization but one also runs the risk of experiencing premature polymerization of the polymerizably reactive solvent. This latter effect is also undesirable and must be avoided. By the practice of the present invention, all of these shortcomings of the prior art are avoided. In the first place, the polyester resin can be charged into the solvent immediately after it has been completely esterified and without any significant cooling of the resin, without experiencing any loss due to volatilization, or any loss due to premature polymerization of the reactive solvent. It can be seen from this that the technique of the present invention saves time and materials and produces a better product more quickly.

In the preparation of the polyester resins of the present invention, one may utilize any of the polyhydric alcohols such as ethylene glycol, propylene glycol, diethylene glycol, dipropylene glycol, trimethylene glycol, tetramethylene glycol, pinacol, arabitol, xylitol, adonitol, mannitol, glycerol, trimethylol propane, trimethylol ethane, sorbitol, pentaerythritol, dipentaerythritol, or the alkane diols such as butanediol-1,4, pentanediol-1,5, hexanediol-1,6, and the like. These polyhydric alcohols may be used either singly or in combination with one another. It is generally preferred that the polyhydric alcohol used be predominantly a dihydric alcohol although minor amounts up to about 10 to 25% of higher hydric alcohols such as trihydric, tetrahydric, hexahydric alcohols may be used. In the unsaturated polyester resins, it is generally desired that there be produced a linear polyester resin with polymerizable sites available for cross-linking with the polymerizably reactive monomer. For the purpose of making unsaturated polyester resins then, it can be seen that the diols, and more particularly the glycols, are preferred. When the blend of a dihydric alcohol with a polyhydric alcohol having more than two hydroxy groups are utilized, the average functionality of the alcohols used should not be significantly above about 2.25.

In the preparation of the polyester resins used in the process of the present invention, one may utilize such polycarboxylic acids as those polycarboxylic acids which are free of non-benzenoid unsaturation including phthalic acid, oxalic acid, malonic acid, succinic acid, glutaric acid, sebacic acid, adipic acid, pimelic acid, suberic acid, azelaic acid, tricarballylic acid, citric acid, tartaric acid, maleic acid, and the like. Obviously, these acids may be used either singly or in combination with one another and the anhydrides of said acids, whenever available, may be used either singly or in combination with one another or in combination with the acids. Among the alpha, beta-ethylenically unsaturated polycarboxylic acids which may be used in the practice of the process of the present invention are maleic acid, fumaric acid, aconitic acid, itaconic acid, chloromaleic acid, and the like. The anhydrides of these acids may be used, whenever available. These acids and/or their anhydrides may be used either singly or in combination with one another. In the unsaturated polyester resins, it is desirable to utilize the alpha, beta-ethylenically unsaturated acids in an amount approximating at least 20% by weight of the total weight of the polycarboxylic acids used and preferably in amounts varying between about 25% and 65% by weight based on the total weight of polycarboxylic acid used, the balance being polycarboxylic acids free of non-benzenoid unsaturation.

When the polyester resin is cut with a polymerizably reactive solvent, said solvent is a normally-liquid monomeric material such as styrene, ring-substituted alkyl styrenes, such as ortho-methylstyrene, meta-methylstyrene, para-methylstyrene, ortho-ethylstyrene, para-propylstyrene, 2,4-dimethylstyrene, 2,5-dimethylstyrene, or the ring-substituted halo styrenes such as ortho-chlorostyrene, metabromostyrene, 2,4-dichlorostyrene, 3,4-dibromostyrene, and the like. Additionally, one may make use of such normally-liquid polymerizable monomers as diallyl phthalate, triallyl cyanurate, acrylonitrile, methacryonitrile, ethacrylonitrile, alpha-chloro acrylonitrile, and the like. If the polymerizable monomeric solvent has a boiling point which exceeds about 250° C. which would be the approximate maximum temperature of the hot polyester resin and if it is not desired to utilize a mixture of polymerizable monomeric solvents wherein one of the solvents has a boiling point below the temperature of the hot polyester resin, one can make use of a lower boiling inert organic solvent in combination with the higher boiling polymerizable reactive monomeric solvent with equal efficiency. For instance, if one were to cut a hot polyester resin material with triallyl cyanurate having a boiling point above 250° C. at atmospheric pressure, one should utilize an inert solvent such as benzene having a boiling point of about 80° C. in order that the heat of vaporization of the flashing benzene would absorb the heat of the unsaturated polyester resin and in that manner permit the immediate dilution of the hot polyester resin without loss of monomeric solvent. In the event that an inert solvent is utilized in combination with the polymerizable monomer, whether low boiling or high boiling, it will be desirable upon the completion of the addition of the hot polyester resin to the cutting kettle to remove said inert solvent. This can be accomplished very readily by flashing off the inert solvent and condensing the same but removing the condensed inert solvent from the system instead of returning the same to the cutting kettle.

The mode of addition of the hot polyester resin to the normally-liquid solvent is not critical. The hot uncut resin may be introduced into the cutting kettle into which has been introduced a predetermined quantity of the solvent material. The amount of solvent material charged to the kettle prior to the introduction of the hot polyester resin is a matter of choice depending, for instance, on the desired formulation of the ultimate resin material. For instance, one would predetermine the amount of polymerizably reactive monomeric solvent charged to the cutting kettle based on the amount desired in the ultimate composition. For these polyester resin compositions in which the polyester contains residues of alpha, beta-ethylenically unsaturated polycarboxylic acids, one may utilize between about 10 parts by weight of the monomeric solvent to about 90 parts of the unsaturated polyester resin up to about 60 parts of the monomeric material to about 40 of the polymerizable unsaturated polyester resin. Preferably, one should use between about 25 parts of the monomeric solvent to about 35 parts of the monomeric solvent with a corresponding 75 parts to about 65 parts of the polymerizable unsaturated polyester resin.

The hot polyester resin immediately upon complete esterification will be conveyed directly to the cutting kettle. To avoid viscosity increases due to temperature drop, the hot polyester resin can be conveyed through steam jacketed pipes to the cutting kettle. It will be apparent that it is extremely desirable that the materials within the cutting kettle be kept under constant agitation during the cutting step in order to achieve uniform distribution of the resin in the solvent and in order to maintain uniform heat distribution. To achieve this under optimum conditions, the hot uncut resin can be introduced into the cutting kettle beneath the surface of the resident solvent and preferably at a point substantially immediately below the agitator. This can be accomplished by utilizing a steam jacketed pipe finger. Since the solvent material is a polymerizably reactive monomeric solvent, it will be desirable to incorporate therein a polymerization inhibitor, many of which are known in the prior art. These polymerization inhibitors may be used in amounts varying from about 0.001% to about 3% by weight based on the total weight of the polymerizable solvent. Illustrative of the conventional types of polymerization inhibitor which are used are hydroquinone, ortho-cresol, meta-cresol, para-cresol, 2,6-ditertiary butyl-4-methyl phenol, orcinol, resorcinol, 2-chloro-5-hydroxy toluene, 2-amino-5-hydroxy toluene, and many others. The prior art as represented by the U.S. Patents 2,457,657, 2,480,928 and 2,632,751 is illustrative of further inhibitors which may be used in the polymerizable solvent in the present invention. The cutting kettle is usually fitted with a coil or a jacket in order that the solvent can be heated to a temperature above room temperature such as at about 50° or 60° C. in order that upon the addition of the hot polyester resin composition that a too sudden cooling of the resin will be avoided. After the solvent has been charged to the cutting kettle in the required amount and heated to the selected temperature, a vacuum is applied to the system and regulated at a value corresponding to the vapor pressure of the solvent at the desired cutting temperature. Allowance may be made for the depression of the solvent vapor pressure as resin is added. It is often advantageous to heat the solvent to its boiling point at the vacuum pressure. The hot resin may then be metered into the cutting kettle at any selected rate but preferably at a rate which will not overload the condenser superimposed above the cutting kettle which is cooled sufficiently to condense the solvent vapors and return the condensed solvent to the cutting kettle. As the hot resin is introduced into the solvent, evaporation of the solvent takes place, absorbing the sensible heat of the resin. Upon the volatilization of the solvent, the vacuum applied to the system permits the solvent vapors to pass into the condenser where cooling converts the vaporous solvent back to the liquid form and upon being returned to the cutting kettle is available again for cooling any additional resin to be added to the cutting kettle.

One of the preferred embodiments of the present invention which may be practiced when the solvent contains a quantity of polymerization inhibitor as is indicated hereinabove, one may provide an orifice or similar metering device for the purpose of feeding a measured quantity of air into the cutting kettle in order to supplement the inhibiting effect of the polymerization inhibitor incorporated into the polymerizable solvent. The amount of air that may be bled into the system during the cutting operation may be varied over a fairly wide range up to an approximate maximum of 400 cubic feet per minute for each 3500 pounds of polymerizable monomer in the cutting kettle. For fractional or multiple amounts of monomer present in the cutting kettle, the maximum amount of air bled into the system can be varied either upwardly or downwardly. There is no lower limit to the amount of air bled into the system inasmuch as one can operate the cutting technique without bleeding any air into the system. Precaution should be taken to avoid bleeding so much air into the system so as to destroy or render ineffectual the vacuum placed on the system. Preferably, one would bleed between 5 cubic feet and 20 cubic feet per minute into the system based on 3500 pounds of polymerizable monomer in the kettle. For optimum results, between about 8 cubic feet and 12 cubic feet per minute may be bled into the system per 3500 pounds of polymerizable monomer in the cutting kettle.

The temperature of the monomer in the cutting kettle can be varied over a fairly substantial range such as between room temperature, i.e., about 25° C. and 100° C. and preferably between about 40° C. and 60° C. depending upon the type of monomer utilized and the quantity utilized. The vacuum on the system will vary inversely with the temperature of the monomer in the cutting kettle initially. For instance, at 25° C. the vacuum will be about 1 mm. of pressure whereas at 100° C. the vacuum will be about 120 mm. of pressure. At 40° C. the vacuum will be about 10 mm. of pressure; at 50° C. the vacuum will be about 20 mm. of pressure; at 60° C. the vacuum will be about 30 mm. of pressure while at 70° C. the vacuum will be about 45–50 mm. of pressure. The measurements of vacuum recited hereinabove are given in absolute terms rather than in negative terms, i.e., a vacuum of 60 mm. is 700 mm. below one standard atmosphere of pressure. The polymerization inhibitor incorporated into the reactive monomer serves its purpose as long as the monomer is in the liquid state. However, when the reactive monomer volatilizes, it leaves substantially all of the inhibitor incorporated into the liquid monomer remaining in the liquid phase of the monomer. When the monomer is volatilized to the vapor state, it is desirable to bleed air into the vaporous monomer in order to preclude the possibility of undesirable polymerization in the system, particularly in the condenser.

Reference is made to the accompanying drawing which is virtually self-explanatory. The cutting kettle is equipped with an agitator, a solvent charge inlet, an uncut resin inlet and a valve for removing the cut resin. The cutting kettle is additionally equipped with a coil or jacket. Optionally, the kettle is equipped with an orifice or a similar metering device for feeding a measured quantity of air into the cutting kettle, which air functions as a polymerization inhibitor for the volatilized monomer, particularly in the condenser and in the conduit leading to the condenser. Superimposed above the kettle and connected thereto by a two-way conduit is the condenser which is cooled by suitable means such as water cooled coils and into which the volatilized inhibited monomer is returned to the liquid state and passed back into the cutting kettle. Above the condenser is the vacuum system complete with the conventional vacuum control valves and instruments. If desired, for a particular monomer, one could superimpose in the stream above the condenser, a further condenser as indicated which would be refrigerated with a brine or the like in order to insure that there is no monomer loss.

In order that the present invention may be more completely understood, the following examples are set forth in which all parts are parts by weight. These examples are set forth primarily for the purpose of illustration and any specific enumeration of detail contained therein should not be interpreted as a limitation on the case except as is indicated in the appended claims.

EXAMPLE 1

Into a suitable reaction vessel [equipped as] *not* shown in the accompanying drawing, there is introduced 3 mols of phthalic anhydride, 3 mols of fumaric acid and 6.6 mols of propylene glycol. With constant agitation, the charge is heated to about 210–220° C. and maintained at that temperature until the esterification is substantially complete as indicated by an acid number of about 30–40. Just prior to the completion of the esterification reaction, there is introduced into a cutting kettle 50 parts of monomeric styrene containing about 0.02% by weight of ditertiary butyl hydroquinone based on the weight of the styrene per 100 parts of the unsaturated polyester resin being separately prepared. The styrene containing the inhibitor is warmed to about 60° C.

whereupon with constant agitation there is introduced gradually over a period of time in a substantially constant stream 100 parts of the unsaturated polyester resin thus prepared, and at a temperature of about 210° C. A vacuum of 30 mm. of mercury was applied to the system just prior to the initiation of the introduction of the polyester resin into the styrene. The hot polyester resin was introduced into the warmed styrene monomer through a steam jacketed pipe finger directly under the agitator and below the surface of the styrene solvent in the cutting kettle. As the hot polyester resin is being fed into the cutting kettle, there is bled into the system air in amounts approximating 8 cubic feet per minute per 3500 pounds of monomer in the cutting kettle. The monomeric styrene becomes volatilized in part and passes through a conduit into the cooling condenser whereupon substantially all of the vaporized styrene is condensed and returned as liquid styrene to the cutting kettle. The time elapsed from the initiation of the introduction of the hot polyester resin into the styrene solvent is slightly over 1½ hours whereas the average cutting time for a polyester resin of the exact same description and in the same quantity by conventional procedures is about 8 hours. Upon the completion of the addition of the hot polyester resin to the styrene solvent, the temperature of the blend has reached about 60° C. and is then ready for further cooling and packaging for sale.

I claim:

1. A process for blending a hot resin and a polymerizable solvent comprising introducing a hot polyester resin, at a temperature between about 180° C. and 210° C. and prepared by reacting an aliphatic diol with an alpha, beta-ethylenically unsaturated dicarboxylic acid, into a normally-liquid polymerizable monomer containing a polymerization inhibitor while maintaining the system under a vacuum evaporating the monomer to absorb the sensible heat from the hot resin and condensing the gaseous monomer in a condenser and returning the liquid monomer thus condensed to the blending vessel wherein said monomer in the mixing kettle initially has a temperature varying between about 25° C. and 100° C. and the vacuum on said kettle during the polyester resin addition is varied inversely with said monomer temperature between about 1 mm. and 120 mms. [below atmospheric pressure.]

2. A process for blending a hot resin and a polymerizable solvent comprising introducing a hot polyester resin, at a temperature between about 180° C. and 210° C. and prepared by reacting an aliphatic diol with an alpha, beta-ethylenically unsaturated dicarboxylic acid, into a normally-liquid polymerizable styrene containing a polymerization inhibitor while maintaining the system under a vacuum, evaporating said styrene to absorb the sensible heat from the hot resin and condensing the gaseous styrene in a condenser and returning said liquid styrene thus condensed to the blending vessel wherein said styrene in the mixing kettle initially has a temperature varying between about 25° C. and 100° C. and the vacuum on the kettle during the polyester resin addition is varied inversely with said styrene temperature between about 1 mm. and 120 mms. [below atmospheric pressure.]

3. A process for blending a hot resin and a polymerizable solvent comprising introducing a hot polyester resin, at a temperature between about 180° C. and 210° C. and prepared by reacting an aliphatic diol with an alpha, beta-ethylenically unsaturated dicarboxylic acid, into styrene containing a polymerization inhibitor while maintaining the system under a vacuum, evaporating the styrene to absorb the sensible heat from the hot resin and condensing the gaseous styrene in a condenser and returning the liquid styrene thus condensed to the blending vessel wherein said styrene in the mixing kettle initially has a temperature varying between about 25° C. and 100° C. and the vacuum on the kettle during the polyester resin addition is varied inversely with said styrene temperature between about 1 mm. and 120 mms. [below atmospheric pressure.]

4. A process for blending a hot resin and a polymerizable solvent comprising introducing a hot polyester resin, at a temperature between about 180° C. and 210° C. and prepared by reacting an aliphatic diol with an alpha, beta-ethylenically unsaturated dicarboxylic acid, into a normally-liquid polymerizable monomer containing a polymerization inhibitor while maintaining the system under a vacuum, while bleeding air into the blending vessel into the vaporous monomer so as to inhibit further the polymerization of the monomer, evaporating the monomer to absorb the sensible heat from the hot resin and condensing the gaseous monomer in a condenser and returning the liquid monomer thus condensed to the blending vessel wherein said monomer in the mixing kettle initially has a temperature varying between about 25° C. and 100° C. and the vacuum on said kettle during the polyester resin addition is varied inversely with said monomer temperature between about 1 mm. and 120 mms. [below atmospheric pressure.]

5. A process for blending a hot resin end a polymerizable solvent comprising introducing a hot polyester resin, at a temperature between about 180° C. and 210° C. and prepared by reacting an aliphatic diol with an alpha, beta-ethylenically unsaturated dicarboxylic acid, into a normally-liquid polymerizable styrene containing a polymerization inhibitor while maintaining the system under a vacuum, while bleeding air into the blending vessel into the vaporous styrene so as to inhibit further the polymerization of said styrene, evaporating said styrene to absorb the sensible heat from the hot resin and condensing the gaseous styrene in a condenser and returning said liquid styrene thus condensed to the blending vessel wherein said styrene in the mixing kettle initially has a temperature varying between about 25° C. and 100° C. and the vacuum on the kettle during the polyester resin addition is varied inversely with said styrene temperature between about 1 mm. and 120 mms. [below atmospheric pressure.]

6. A process for blending a hot resin and a polymerizable solvent comprising introducing a hot polyester resin, at a temperature between about 180° C. and 210° C. and prepared by reacting an aliphatic diol and with an alpha, beta-ethylenically unsaturated dicarboxylic acid, into styrene containing a polymerization inhibitor while maintaining the system under a vacuum, while bleeding air into the blending vessel into the vaporous styrene so as to inhibit further the polymerization of the styrene, evaporating the styrene to absorb the sensible heat from the hot resin and condensing the gaseous styrene in a condenser and returning the liquid styrene thus condensed to the blending vessel wherein said styrene in the mixing kettle initially has a temperature varying between about 25° C. and 100° C. and the vacuum on the kettle during the polyester resin addition is varied inversely with said styrene temperature between about 1 mm. and 120 mms. [below atmospheric pressure.]

7. A process for blending a hot resin and a polymerizable solvent comprising introducing a hot polyester resin, at a temperature between about 150° C. and 250° C. and prepared by reacting an aliphatic diol with an alpha, beta-ethylenically unsaturated dicarboxylic acid, into a normally-liquid polymerizable monomer containing a polymerization inhibitor while maintaining the system under a vacuum, evaporating the monomer to absorb the sensible heat from the hot resin and condensing the gaseous monomer in a condenser and returning the liquid monomer thus condensed to the blending vessel wherein said monomer in the mixing kettle initially has a temperature varying between about 25° C. and 100° C. and the vacuum on said kettle during the polyester resin addition is varied inversely with said monomer temperature between about 1 mm. and 120 mms. [below atmospheric pressure.]

8. A process for blending a hot resin and a polymerizable solvent comprising introducing a hot polyester resin, at a temperature between about 150° C. and 250° C. and prepared by reacting an aliphatic diol with an alpha, beta-ethylenically unsaturated dicarboxylic acid, into a normally-liquid polymerizable styrene containing a polymerization inhibitor while maintaining the system under a vacuum, evaporating said styrene to absorb the sensible heat from the hot resin and condensing the gaseous styrene in a condenser and returning said liquid styrene thus condensed to the blending vessel wherein said styrene in the mixing kettle initially has a temperature varying between about 25° C. and 100° C. and the vacuum on the kettle during the polyester resin addition is varied inversely with said styrene temperature between about 1 mm. and 120 mm. [below atmospheric pressure.]

9. A process for blending a hot resin and a polymerizable solvent comprising introducing a hot polyester resin, at a temperature between about 150° C. and 250° C. and prepared by reacting an aliphatic diol with an alpha, beta-ethylenically unsaturated dicarboxylic acid, into styrene containing a polymerization inhibitor while maintaining the system under a vacuum, evaporating the styrene to absorb the sensible heat from the hot resin and condensing the gaseous styrene in a condenser and returning the liquid styrene thus condensed to the blending vessel wherein said styrene in the mixing kettle initially has a temperature varying between about 25° C. and 100° C. and the vacuum on the kettle during the polyester resin addition is varied inversely with said styrene temperature between about 1 mm. and 120 mms. [below atmospheric pressure.]

10. A process for blending a hot resin and a polymerizable solvent comprising introducing a hot polyester resin, at a temperature between about 150° C. and 250° C. and prepared by reacting an aliphatic diol with an alpha, beta-ethylenically unsaturated dicarboxylic acid, into a normally-liquid polymerizable monomer containing a polymerization inhibitor while maintaining the system under a vacuum, while bleeding air into the blending vessel in the vaporous monomer above the liquid level in the vessel in order to inhibit further the polymerization of the monomer, evaporating the monomer to absorb the sensible heat from the hot resin and condensing the gaseous monomer in a condenser and returning the liquid monomer thus condensed to the blending vessel wherein said monomer in the mixing kettle initially has a temperature varying between about 25° C. and 100° C. and the vacuum on said kettle during the polyester resin addition is varied inversely with said monomer temperature between about 1 mm. and 120 mms. [below atmospheric pressure.]

11. A process for blending a hot resin and a polymerizable solvent comprising introducing a hot polyester resin, at a temperature between about 150° C. and 250° C. and prepared by reacting an aliphatic diol with an alpha, beta-ethylenically unsaturated dicarboxylic acid, into a normally-liquid polymerizable styrene containing a polymerization inhibitor while maintaining the system under a vacuum, while bleeding air into the blending vessel into the vaporous monomeric material above the liquid level so as to inhibit further the polymerization of said styrene, evaporating said styrene to absorb the sensible heat from the hot resin and condensing the gaseous styrene in a condenser and returning said liquid styrene thus condensed to the blending vessel wherein said styrene in the mixing kettle initially has a temperature varying between about 25° C. and 100° C. and the vacuum on the kettle during the polyester resin addition is varied inversely with said styrene temperature between about 1 mm. and 120 mms. [below atmospheric pressure.]

12. A process for blending a hot resin and a polymerizable solvent comprising introducing a hot polyester resin at a temperature between about 150° C. and 250° C. and prepared by reacting an aliphatic diol with an alpha, beta-ethylenically unsaturated dicarboxylic acid, into styrene containing a polymerization inhibitor while maintaining the system under a vacuum. while bleeding air into the blending vessel into the vaporous monomeric material above the liquid level so as to inhibit further the polymerization of said styrene, evaporating said styrene to absorb the gaseous styrene in a condenser and returning said liquid styrene thus condensed to the blending vessel wherein said styrene in the mixing kettle initially has a temperature varying between about 25° C. and 100° C. and the vacuum on the kettle during the polyester resin addition is varied inversely with said styrene temperature between about 1 mm. and 120 mms. [below atmospheric pressure.]

References Cited in the file of this patent or the original patent

UNITED STATES PATENTS

| | | |
|---|---|---|
| 2,493,343 | Gerhart | Jan. 3, 1950 |
| 2,647,092 | Meeske et al. | July 28, 1953 |

OTHER REFERENCES

Bjorksten et al.: "Polyesters and Their Applications," Reinhold Pub. Corp., New York, 1956, pages 39, 42 and 43.

Church et al.: "Industrial and Eng. Chem.," volume 47, No. 12, December 1955, pages 2452–2462.